Dec. 15, 1936.   E. R. BARANY   2,064,142
GEOMETRICAL INSTRUMENT
Filed April 2, 1935   6 Sheets-Sheet 1
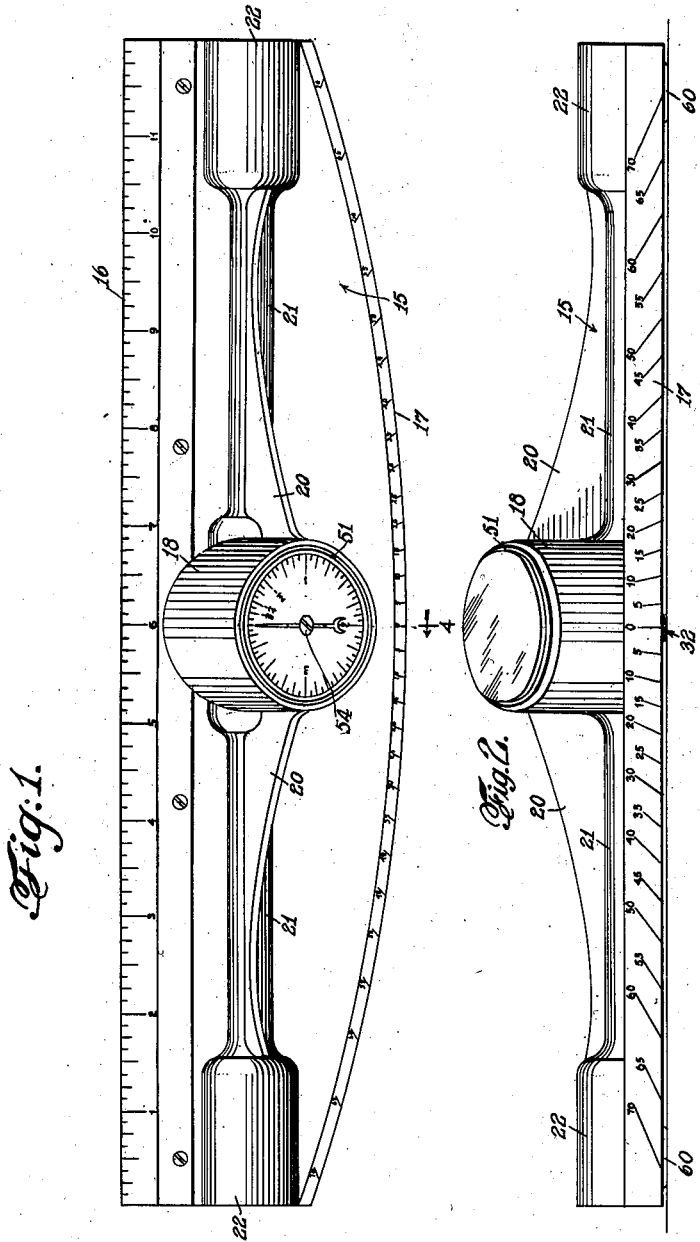
INVENTOR.
Edmund R. Barany
BY
Williams, Rich + Morse
ATTORNEYS Dec. 15, 1936.  E. R. BARANY  2,064,142
GEOMETRICAL INSTRUMENT
Filed April 2, 1935   6 Sheets-Sheet 2
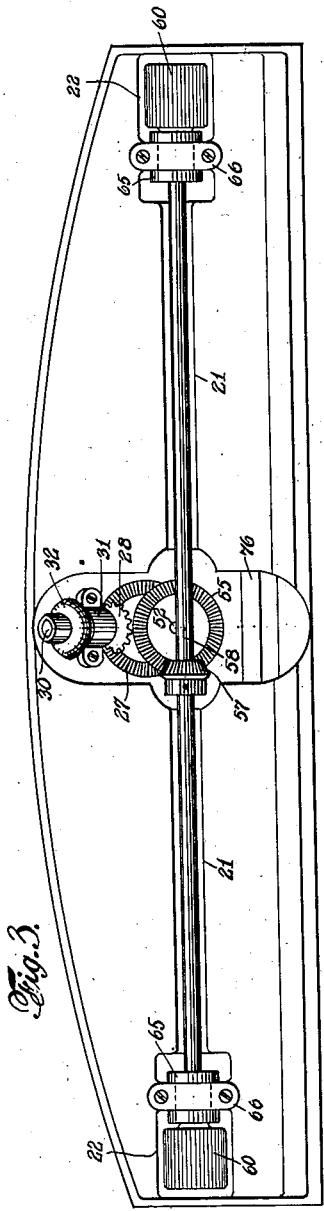
INVENTOR.
Edmund R. Barany
BY
Williams, Rich & Morss
ATTORNEYS

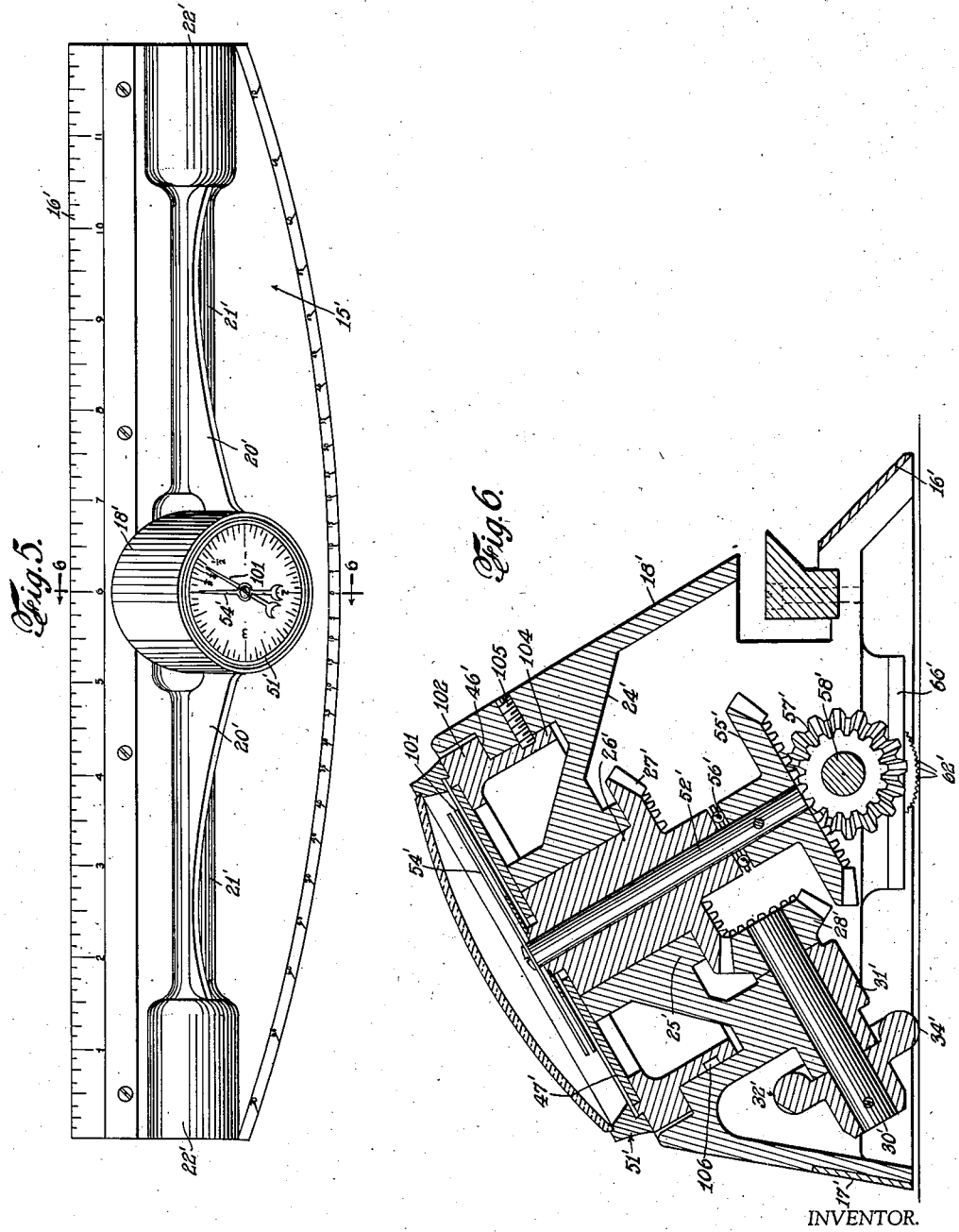

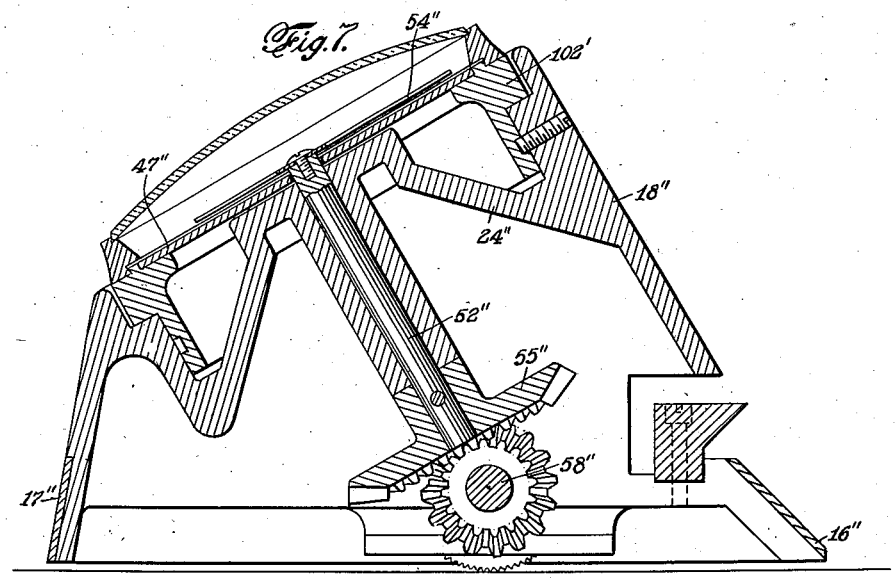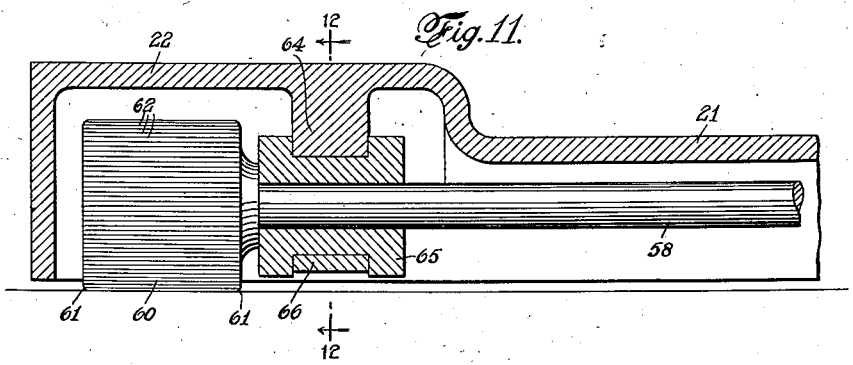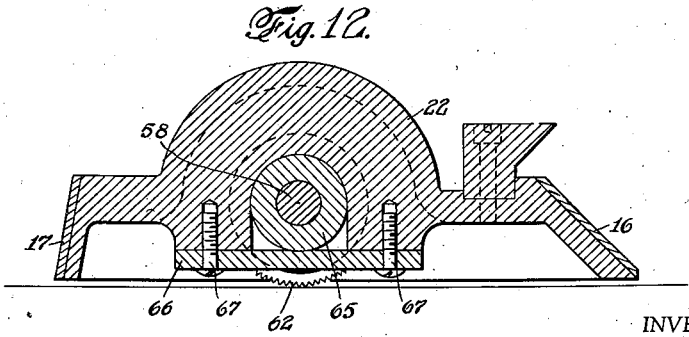

Dec. 15, 1936.  E. R. BARANY  2,064,142
GEOMETRICAL INSTRUMENT
Filed April 2, 1935   6 Sheets-Sheet 5

INVENTOR.
Edmund R. Barany
BY
Williams, Rich & Morse
ATTORNEYS

Dec. 15, 1936.　　　　E. R. BARANY　　　　2,064,142
GEOMETRICAL INSTRUMENT
Filed April 2, 1935　　　6 Sheets-Sheet 6
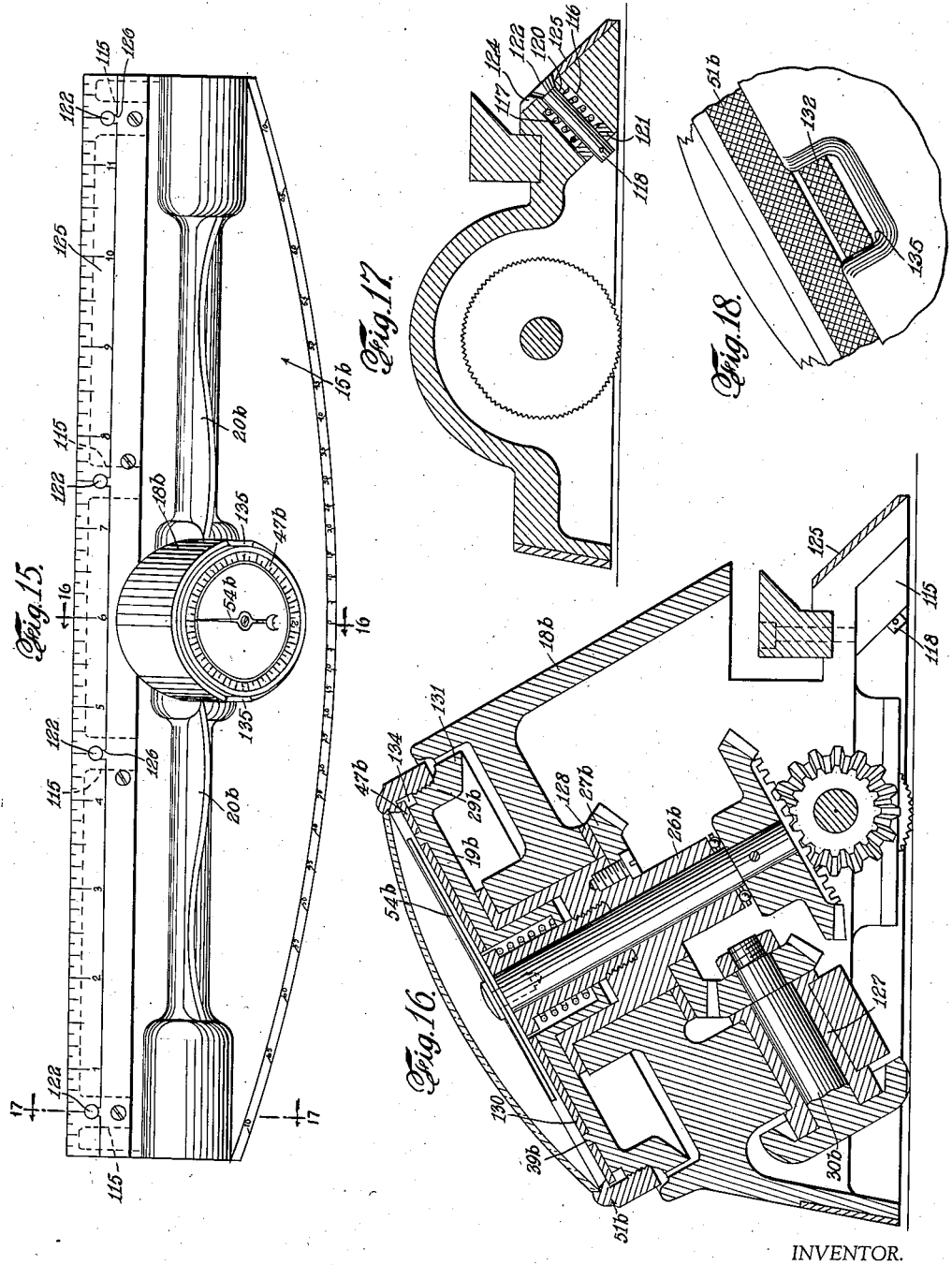
INVENTOR.
Edmund R. Barany
BY
Williams, Rich & Morse
ATTORNEYS Patented Dec. 15, 1936

2,064,142

UNITED STATES PATENT OFFICE 2,064,142

GEOMETRICAL INSTRUMENT

Edmund R. Barany, New York, N. Y.

Application April 2, 1935, Serial No. 14,220

11 Claims. (Cl. 33—109)

This invention relates generally to geometrical instruments, and has particular reference to drafting apparatus.

An important object of the invention is to provide an improved drafting apparatus, which is simple in construction, inexpensive to manufacture, reliable in use, accurate in operation, and which is such that it may be so employed as to facilitate the many classes of work for which it is especially adapted to be used.

Other objects and advantages of the invention will become apparent from the following description, taken in connection with the accompanying drawings, in which—

Figure 8:
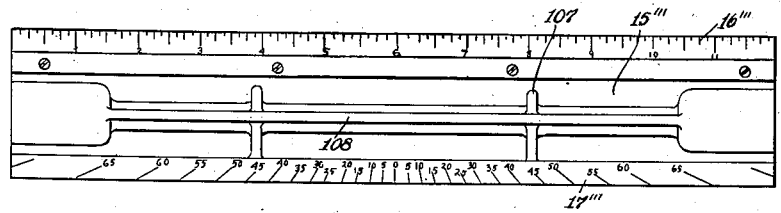
Figure 9:
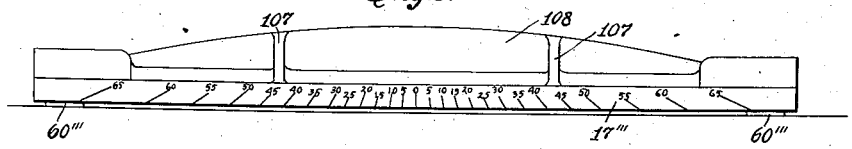
Figure 10:
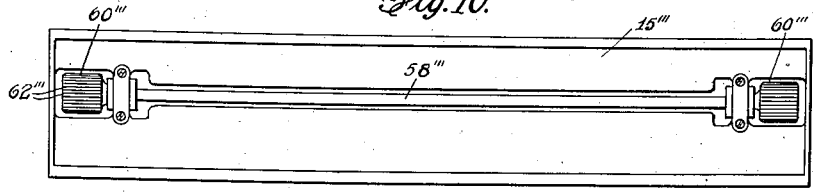
Figure 13:
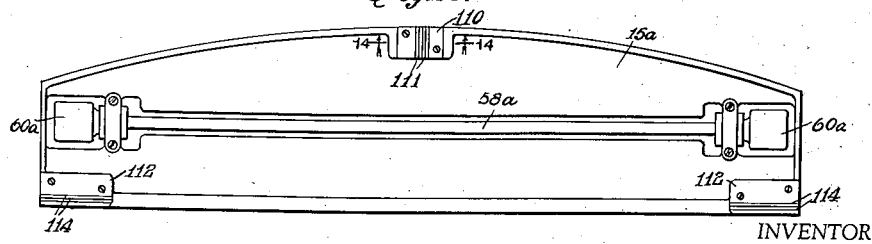
Figure 14:
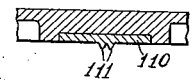

Fig. 1 is a plan view, three-quarter size, of a drafting apparatus embodying the invention; Fig. 2 is a rear elevation of the apparatus; Fig. 3 is a bottom view of the apparatus; Fig. 4 is an enlarged transverse sectional view taken on line 4—4 of Fig. 1; Fig. 5 is a plan view of another form of the invention; Fig. 6 is an enlarged transverse sectional view taken on line 6—6 of Fig. 5; Fig. 7 is a view similar to Figs. 4 and 6 and showing a somewhat simplified form of the invention; Fig. 8 is a view similar to Figs. 1 and 5 and showing a further simplified form of the invention; Fig. 9 is a rear elevation of the apparatus shown in Fig. 8; Fig. 10 is a bottom view of the apparatus shown in Figs. 8 and 9; Fig. 11 is an enlarged view, partly in section and partly in elevation, showing in detail one of a pair of bearings by which the longitudinal shaft is supported in each of the several forms of the invention, and Fig. 12 is a transverse, sectional view taken on line 12—12 of Fig. 11, Fig. 13 is a bottom view of another simplified embodiment of the invention which is characterized by a modified form of contact means, by which the apparatus may be held against undue shifting as it is moved from one position to another; Fig. 14 is a transverse sectional view taken on line 14—14 of Fig. 13; Fig. 15 is a plan view of another form of the invention; Fig. 16 is an enlarged transverse sectional view taken on line 16—16 of Fig. 15; Fig. 17 is an enlarged transverse sectional view taken on line 17—17 of Fig. 15, and Fig. 18 is an enlarged fragmental view in elevation of the upwardly and rearwardly extending cylindrical shell of Figs. 15 and 16 as viewed from the right in Fig. 15.

Referring particularly to Figs. 1 to 4 inclusive the numeral 15 indicates a transversely and longitudinally movable housing-like body member, which is so designed as to enable it to be either cast of metal or molded from a suitable material, such as "bakelite". The front margin of the body member presents a straight-edge and is provided with a scale 16, preferably of metal, which may be graduated in any desired units of linear measure, such as inches and fractions thereof, whereas the rear margin of the body member presents a curved edge to which is attached a scale 17, preferably of metal, which may be graduated in terms of degrees so as to enable it to serve as a protractor, by which angular measurements may be made with respect to a line of reckoning passing through the midpoint graduation of the scale 16 and the zero graduation of the scale 17. As shown most clearly in Figs. 1, 2 and 4, the body member 15 includes an upwardly and rearwardly extending cylindrical shell 18, from which a pair of gusset-like webs 20 extend toward opposite ends of the body member, which webs not only reinforce the body member but also serve as hand grips by which the device may be conveniently moved from one position to another. As shown most clearly in Figs. 1 and 2, the webs 20 merge with upwardly projecting shaft and contact-roller housings 21 and 22, respectively, the shaft housings projecting from the cylindrical shell 18 toward the opposite ends of the body member and there terminating in or merging with the roller housings.

As shown most clearly in Fig. 4, the cylindrical shell 18 is formed with a divisional wall 24 which extends generally transversely thereof, the primary function of the wall being to afford a central bearing 25, within which is journalled a tubular shaft 26, provided intermediate its ends with a bevel gear 27, meshing with a similar gear 28, secured to the inner end of a driving shaft 30, journalled in a bearing 31, depending generally downwardly from the wall 24. To the outer end of the shaft 30, there is connected a contact roller 32, the peripheral surface of which is serrated so as to present an annular series of tooth-like ribs 34, which extend in a radial direction from the axis of the shaft 30 and are adapted to engage and slightly penetrate the surface of a sheet of drawing paper when the device is shifted from one position to another thereon, it being noted that as the device is moved longitudinally the roller 32 so coacts with the surface of the drawing paper as to effect a positive driving action on the shaft 30 in one direction or another depending on the direction in which the device is moved longitudinally, whereas when the device is shifted at right angles to itself the shaft 30 remains stationary because its associated roller 32 slides over the drawing paper without turning, the particular roller rib 34 then engaging the paper making a shallow groove-like depression in the surface of the paper as it rides thereover. Although each of the ribs 34 is of a substantial length, they are such that they respectively make only point contact, practically speaking, with the surface of the paper, due to the fact that their outer edges are so curved that whichever one is in engagement with the surface of the paper at a given instant is inclined upwardly at its front and at its rear, as will be readily understood when it is taken into account that the radius of curvature of each rib is the same as that of the bead-like peripheral rim 35 of the roller when considered in transverse longitudinal section.

The upper end of the shaft 26 is provided with a tapered opening 36, adapted to receive a similarly shaped clutch-like driving hub 37, which is provided at its lower end with an inwardly extending flange 38 and is connected at its upper end to a rotatable dial-plate 19, the peripheral margin of which is provided with a depending reinforcing flange 29, terminating slightly above a ledge 46, with which the inner wall of the cylindrical shell 18 is provided. The clutch-like hub 37 is maintained in frictional driving engagement with the wall of the tapered opening 36 by a compression spring 41, confined intermediate the flange 38 of the hub 37 and an outwardly extending shoulder 42 carried at the upper end of a tubular sleeve 44, about which the hub 37 and the spring 41 are disposed, the sleeve 44 being held in a fixed relation to the shaft 26 by reason of the union that is afforded between its lower screw-threaded end and the internal screw threads of a sleeve-receiving pocket 45 with which the shaft 26 is provided. The dial-plate 19 is provided on its upper peripheral margin with an annular bead 39, which serves as a means by which a graduated dial 47 may be secured to the dial-plate 19, as by a press fit, the dial being graduated at its peripheral margin in terms of linear measure, such for example as inches and fractions thereof as shown in Fig. 1. The bead 39 serves not only as a convenient means for establishing a driving connection between the dial-plate 19 and the dial 47, but also as a lock flange for the retention of a removable bezel and crystal unit 51 of the general type employed in ordinary watch-case construction.

Journalled within the tubular shaft 26 and its associated sleeve 44, is a driving shaft 52, to the upper end of which is connected a pointer 54 and to the lower end of which is connected a bevel gear 55. In order to relieve, as far as possible, any friction between the shaft 26 and the hub portion of the gear 55, there is disposed intermediate such shaft and hub portion an anti-friction thrust bearing 56. Meshing with the bevel gear 55, is a similar gear 57, carried by a longitudinally disposed drive shaft 58, which is accommodated by the shaft housings 21 and provided at its opposite ends with contact rollers 60, which are accommodated by the roller housings 22, each of the rollers being slightly rounded or chamfered at its opposite ends, as shown most clearly at 61 in Fig. 11, and serrated on its periphery so as to present an annular series of tooth-like ribs 62, which are parallel to each other and to the axis of the shaft 58. In order that the shaft 58, with its contact rollers 60 fixed thereon, may be conveniently assembled within the body member 15, such body member is molded with a half bearing 64 at each end thereof, such half bearings being adapted to receive spool-like journals 65 which are applied to the shaft 58 prior to fixing the contact rollers thereon and which are held against displacement on the half bearings 64 by a pair of straps 66, the straps being of substantially the same width as the half bearing and connected to such bearings by lag screws 67.

From the description of the invention thus far, it will become apparent that the device may be utilized as a scale, a protractor, a parallel ruler, and as a means for measuring, through the instrumentality of a single indicator unit, distances to be reckoned either longitudinolly or vertically, it being understood that longitudinal movement of the device in either direction will cause the dial 47 to rotate while the pointer 54 remains stationary, that vertical movement of the device in either direction will cause the pointer 54 to move while the dial remains stationary, and that the dial (due to the frictional driving engagement between its associated dial-plate 19 and the tubular shaft 26) may be manually rotated independently of that shaft, and of course the shaft 52, when it is desired, for example, to effect registration between the pointer and any one of the graduations of the dial.

If desired, the device shown in Figs. 1 to 4 may be modified in accordance with the disclosure of Figs. 5 and 6, wherein primed reference characters are employed to indicate such elements as are common to and have been described in connection with the device of Figs. 1 to 4.

Referring particularly to Figs. 5 and 6, it will be noted that an additional pointer 101 is employed, and that such pointer is connected to the tubular shaft 26' in lieu of the dial 47, hereinbefore described as connected to the tubular shaft 26. In the present instance, it will be understood that as the device is moved in a direction perpendicular to the straight-edge which is presented by the front margin of the body member 15', the pointer 54' will move in one direction or another, and that as the device is moved in a parallel relation to the axis of its shaft 58', the pointer 101 will be moved in one direction or the other as and in the manner in which the dial 47, hereinbefore described, is moved. In order that the extent of movement of the device may be indicated by either the pointer 54' or the pointer 101, there is provided a graduated dial 47' which is carried by a flange ring 102, which is rotatably supported on the ledge 46' of the cylindrical shell 18' and is provided with a depending skirt 104 having bearing engagement with the inner wall of the cylinder shell. The flange ring 102 is held against axial displacement by a pilot screw 105, passing through the wall of the cylindrical shell 18' and projecting into an annular groove 106, formed in the periphery of the depending skirt 104. Although the pilot screw 105 effectively serves to retain the flange ring 102 against longitudinal displacement, its presence does not, of course, impede manual rotation of the flange ring and its associated crystal unit 51' when it is desired to effect registration between a given graduation of the dial 47' and either of the pointers 54' and 101', as when the device is at rest.

Although the form of invention shown in Fig. 7 is a modification of the respective devices shown in Figs. 1 to 4 and in Figs. 5 and 6, it is more closely related to the structure of Figs. 5 and 6. However, reference will be made in the following description to Figs. 1 to 4, and 5 and 6, wherever such reference is deemed necessary for the sake of brevity and clarity, primed reference characters being employed to indicate such elements as correspond to those first described in connection with Figs. 5 and 6 and double primed reference characters being employed to indicate such elements as correspond to those first described in Figs. 1 to 4.

Referring particularly to Fig. 7, it will be noted that the divisional wall 24″ of the cylindrical shell 18″ serves as a journal bearing for a single shaft, namely, the shaft 52″ to which the pointer 54″ is connected, which pointer is employed in connection with its associated dial 47″ for indicating the extent of vertical movement of the device in one direction or the other, no provision being made in the present instance for indicating the extent of longitudinal movement of the device in either direction, as in the structures of Figs. 1 to 4 and Figs. 5 and 6, which accounts for the omission from the present modification of the tubular shaft 26, Fig. 4, and shaft 26′, Fig. 6, and their associated driving mechanisms.

If desired, the invention may be further modified according to Figs. 8 to 10, wherein triple primed reference characters are employed to indicate such elements as correspond to those first described in connection with Figs. 1 to 4.

Referring to Figs. 8 to 10, it will be noted that no provision is made for indicating the extent of movement of the device in any direction, and for that reason the body member 15‴ may assume the form of a relatively simple molded element, provided, if desired, with transversely extending reinforcing ribs 107, which are in union with a longitudinally disposed gusset-like web 108. The web 108, like the webs 20, Figs. 1 and 2, and the webs 20′, Fig. 5, serves to not only reinforce the body member, but also as a hand grip by which the device may be conveniently moved from one position to another over the surface of a sheet of drawing paper. In the present instance, it is to be noted that the device, as is also true of the previously described forms of the invention, is held on true right-angle courses in its vertical and longitudinal movements by reason of the fact that the tooth-like ribs 62‴ so penetrate and coact with the surface over which the rollers 60‴ are moved as to impede other than vertical and longitudinal movements thereof, as will be understood when it is taken into account that the rollers, which are held against simultaneous rotation and translation by the ribs 62‴, must rotate about their common axis and at the same time slide longitudinally thereof if the device is forcibly moved in any other than right-angle directions.

Inasmuch as the present form of the invention does not include an indicator unit for indicating the extent of movements of the device either vertically or longitudinally, the body member 15‴ may be conveniently formed at its rear margin to present a straight edge rather than a curved edge, as is necessitated in the devices of Figs. 1 to 4, 5 and 6, and Fig. 7 due to the presence of the cylindrical shells 18, 18′ and 18″, respectively, and hence the protractor scale 17‴ in the present instance may be in the form of a flat rather than a curved strip of metal.

Although the form of invention shown in Figs. 13 and 14 is, generally speaking, a modification of the respective devices already described, it is more closely related to the structure of Figs. 8 to 10, and for that reason reference will be made in the following description to Figs. 8 to 10, wherever such reference is deemed necessary for the sake of brevity and clarity, reference characters bearing the exponent $a$ being employed to indicate such elements as correspond to those employed in Figs. 8 to 10.

Referring particularly to Figs. 13 and 14, it will be noted that the protractor 17a is curved to conform to the curvature which is presented by the rearwardly extending margin of the body member, such extension being provided in order to accommodate a rudder shoe 110 in the form of a plate, which is secured to the lower rear face of the body member at a point intermediate its ends. This rudder plate 110 is let into and comes flush with the lower face of the body member, and is provided with a pair of parallel tooth-like ribs 111 disposed on opposite sides of and in a parallel relation to the transverse medial line passing through the axis of the drive shaft 58a at right angles thereto. The body member 15a is provided at its forward corners with a pair of similar rudder plates 112, which are let into and come flush with the front and end walls of the body member. These rudder plates are each provided with a pair of parallel tooth-like ribs 114, the respective ribs of one rudder plate being in alignment with corresponding ribs of the other rudder plate and all of such ribs being parallel to the axis of the drive shaft 58a. The ribs 111 and 114 are of such height that when the body member is tilted rearwardly about the axis of the shaft 58a, the ribs 111 will engage the surface on which the rollers 60a rest and the ribs 111 will disengage that surface; whereas, when the body member is tilted forwardly about the axis of the shaft 58a, the ribs 114 will engage the surface on which the rollers 60a rest and the ribs 111 will disengage that surface. In view of the nature of the ribs 111 and 114 and the relation that they bear to each other, it becomes apparent that the ribs 111 will effectively serve, when in engagement with the surface on which the rollers 60a rest, to hold the device on a true or straight course when the device is moved across a drawing board at right angles to the axis of its shaft 58a, and that the ribs 114, when in engagement with the surface on which the rollers 60a rest, will effectively function to hold the device on a true or straight course when it is moved longitudinally of the axis of the shaft 58a. In the present instance, omission, from the rollers 60a, of tooth-like ribs, such as those employed in connection with the several forms of the invention already described, is accounted for by the presence of the contact ribs 111 and 114, although, if desired, the rollers 60a may be provided, as and for the purpose described, with tooth-like ribs without impairing either the operation or the function of the ribs 108 and 111.

While the form of invention shown in Figs. 15 to 18 is in fact a modification of the respective devices already described, it is more closely related to the structure of Figs. 3 and 4, and for that reason reference will be made in the following description to Figs. 3 and 4, wherever such reference is deemed necessary for the sake of brevity and clarity, reference characters bearing the exponent $b$ being employed to indicate such elements as correspond to those employed in Figs. 3 and 4.

Referring particularly to Figs. 15 to 18, it will be noted that the front or straight-edge margin of the body member 15b is provided on its rear wall with a plurality of lugs 115, each of which is formed with a pocket 116 adapted for the reception of a compression spring 117. This compression spring surrounds the shank portion of a longitudinally displaceable retaining pin 118, which is slidable within an opening 120 formed in the front margin of the body member 15b and is adapted to exert a generally downward thrust on the retaining pin by reason of the fact that one end of the spring is seated on the bottom wall of the pocket 116, whereas its other end is maintained in impinging engagement with a collar 121 carried by the shank portion of the pin and slidably disposed within the pocket. It is to be noted that the heads 122 of the several retaining pins 118, are so shaped as to snugly fit within countersunk openings 124, formed in a detachable scale 125, which corresponds to the scales 16, 16', 16'' and 16''' shown in connection with the previously described forms of the invention, but which differs from those scales in that it is detachably, rather than permanently, connected to the body member, the feature of detachability being taken advantage of to permit ready substitution of a scale graduated, for example, in inches and fractions thereof for one graduated, for example, according to the metric system. In this connection, it will be understood that removal of one scale from the body member 15b and the substitution of another scale is made possible by reason of the fact that the scales are structuraly identical, each being provided at its rear margin with a plurality of slots or notches 126, which serve to accommodate the shank portions of the retaining pins 118 when the scale is forcibly displaced in a generally downward direction, incident to removal, or is forcibly moved generally upward incident to substitution. Although the heads 122 of the retaining pins 118 are held firmly in their respective seated positions by the action of the springs 117 and thus serve to securely retain the scale in position for use, the springs are such as to permit relatively easy manual removal and replacement of the scale since they are capable of being easily compressed to permit the heads 122 of the retaining pins to ride up on to the rear margin of the scale in a bridging relation to the notches 126 as the scale is being removed or replaced.

Considering particularly the structure shown in Fig. 16, it will be noted that certain minor changes are resorted to without effecting the general principle underlying the form of invention shown in Fig. 4, such changes residing, for example, in the provision of a bearing sleeve 127 for the shaft 30b, the provision of a gear 27b which is secured to rather than formed integrally with the tubular shaft 26b, and the provision of a thrust washer 128. The form of invention shown in Fig. 16 is especially characterized by reason of the fact that it provides for quick removal of the dial 47b (graduated, for example, in inches and fractions thereof) to permit the substitution of another structurally identical dial, graduated, for example, according to the metric system. In order that the dial 47b may be readily removed or replaced without interference, due to the presence of the pointer 54b, such dial is in the form of an annular ring, supported on the peripheral margin of the dial plate 19b and embracing the annular bead 39b with which that dial plate is provided, it being observed that the graduations of the dial extend to the inner edge of the same, as shown in Fig. 15, and are, therefore, so located with reference to the path of movement of the end of the pointer 54b as to enable readings to be taken with the same degree of accuracy as is afforded by the dial and pointer arrangement of, for example, Fig. 4. If desired, the dial plate 19b may be equipped with a reference plate 130, provided, for example, with decimal equivalents or other data to which an engineer or draftsman may often have occasion to refer in the performance of his usual line of duties, the plate being held within the annular bead 39b, as by a press fit therewith.

The dial 47b is held against displacement on the dial plate 19b by reason of the engagement which is afforded between the peripheral margin of the dial and the removable bezel and crystal unit 51b, which is screw-threadedly connected to the depending reinforcing flange 29b of the dial plate 19b, the lower skirt-like portion 131 of which flange is peripherally knurled, as shown at 132 in Fig. 18.

In order to facilitate removal of the dial 47b, upon removal of the bezel and crystal unit 51b, the dial plate 19b is recessed in the vicinity of its juncture with the flange 29b so as to provide a clearance, as shown at 134, between the peripheral margin of the dial plate and the peripheral margin of its associated dial, which clearance extends throughout the peripheral extent of the dial plate so as to permit one to readily grasp and lift the dial from the dial plate in the abeyance of the bezel and crystal unit 51b. Inasmuch as the bezel and crystal unit 51b is screw-threadedly attached to the dial plate 19b, it becomes necessary to retain the dial plate 19b against rotation when either attaching that unit to or removing it from the dial plate. In order to enable one to grasp the skirt-like portion 131, as between one's thumb and forefinger, and thus hold the dial plate against rotation when either attaching the unit 51b to or detaching it from the dial plate, the cylindrical shell 18b is formed with diametrically opposed notches 135, which are disposed in alignment with the peripherally knurled area of the skirt portion 131 of the dial plate and are located, preferably, directly above the junctures of the gusset-like webs 20b with the cylindrical shell 18b, in which locations one's thumb and forefinger are most unlikely to enter them and so engage the knurled periphery of the skirt portion 131 of the dial plate as to interfere with the normal operation of the dial plate but in which positions they are readily accessible to enable one by design to effectively hold the dial plate against rotation, as when removing or replacing the bezel and crystal unit.

From the foregoing it will be observed that in each of the herein described embodiments of the invention, contact means are provided for co-operation with a surface, such as the surface of a sheet of drawing paper, whereby the device is held or guided in true right-angle courses when it is moved vertically and longitudinally, the term "vertical movement" being herein employed for convenience as indicative of movement of the device in a path perpendicular to the axis of its longitudinally disposed shaft and the term "longitudinal movement" being employed as a convenient expression of translatory movement of the device along a path parallel to said shaft. Aside from the foregoing features, which are common to all forms of the invention, it will also be observed that the particular means by which the longitudinally disposed shaft is journalled in the body member is identical in all instances and is such as to permit that shaft and its associated contact rollers to be readily assembled into the several devices.

In so far as the devices of Figs. 1 to 6 and 15 to 18 are concerned, a common feature of primary importance resides in the provision of means which is responsive to movement of the device for indicating the extent of such movement, such indicator means being characterized by the fact that one of its indicator elements is manually adjustable with respect to another of its indicator elements to effect a desired registration of one indicator element with the other, such for example as registration of the pointer 54 with a given graduation of the dial 47 (Figs. 1 to 4) or registration of either of the pointers 54' and 101 with a given graduation of the dial 47' (Figs. 5 and 6) or registration of the pointer 54'' with a given graduation of the dial 47'' (Fig. 7), or registration of the pointer 54b with a given graduation of the dial 47b (Figs. 15 and 16). The advantage to be derived from the indicator unit, because of the fact that one of its indicator elements may be manually moved into a desired registration with another of its indicator elements, will be readily understood when it is taken into account that were not such registration made possible, the operator, when desiring to move the device a definite distance, say, 1⅝'', would be required to reckon from the last indicator reading which may be, for example, 1₁⁹₆'', and such reckoning would not only enhance the possibility of error in calculation, but would also detract from the efficiency of the operator because of the time-consuming factor involved in the calculation and would generally distract his thought or attention from the work at hand, such as that involved, for example, in the laying out of a complicated machine design. To obviate the possibility of error, to eliminate the time-consuming factor, and to insure against distracting the operator's thought or attention from the work at hand, it is merely necessary to manually adjust the graduated dial so that one of its major graduations, such as the zero graduation or one of the inch graduations, will register with the pointer 54 (Figs. 1 to 4), the pointer 54' or the pointer 101 (Figs. 5 and 6), the pointer 54'' (Fig. 7), or the pointer 54b (Figs. 15 and 16), with the result that the operator is required, in his reckoning, to consider only a single fraction, namely 1⅝'', on the dial scale when relative movement between the pointer and the scale is effected incident to bodily displacement of the device as it is moved from its initial position toward and into a desired position of rest.

Aside from the various forms of the invention herein shown and described, other changes may be resorted to without departing from the spirit of the invention or the scope of the following claims.

What is claimed is:

1. A geometrical instrument of the type adapted to be employed as a drafting apparatus, comprising a body member, means for supporting said body member for rolling movement over a drafting surface along two different courses at an angle to each other and including a pair of rollers arranged for alternate rotation as the body member is alternately moved along said courses, an indicator for registering the extent of movement of said body member along said courses and including a pair of indicator elements, one of which is operatively connected to one of said rollers and is adapted to be moved by that roller as the body member is moved along one course, and the other of which is operatively connected to the other of said rollers and is adapted to be moved by that roller as the body member is moved along the other course.

2. A geometrical instrument of the type adapted to be employed as a drafting apparatus, comprising a body member, means for supporting said body member for rolling movement over a drafting surface along two different courses at an angle to each other and including a pair of rollers arranged for alternate rotation as the body member is alternately moved along said courses, an indicator for registering the extent of movement of said body member along said courses and including a pair of indicator elements supported for relative adjustment whereby a coordinated relation may be established therebetween, one of said indicator elements being operatively connected to one of said rollers and adapted to be moved by that roller as the body member is moved along one course, and the other of said indicator elements being operatively connected to the other of said rollers and adapted to be moved by that roller as the body member is moved along the other course.

3. A geometrical instrument of the type adapted to be employed as a drafting apparatus, comprising a body member, means for supporting said body member for rolling movement over a drafting surface along two different courses at an angle to each other and including a pair of rollers arranged for alternate rotation as the body member is alternately moved along said courses, an indicator for registering the extent of movement of said body member along said courses and including a pair of indicator elements, one of which is operatively connected to one of said rollers and is adapted to be moved by that roller as the body member is moved along one course, a manually rotatable support on which the other of said indicator elements is carried and by which that indicator element may be moved into a coordinated relation to said one indicator element, and a driving element on which said support is carried for movement therewith and with relation to which said support may be manually rotated, said driving element being operatively connected to the other of said rollers and adapted to be rotated by that roller as the body member is moved along the other course whereby said other indicator element is rotated with respect to said one indicator element.

4. A geometrical instrument of the type adapted to be employed as a drafting apparatus, comprising a body member, means for supporting said body member for rolling movement over a drafting surface and including a roller, an indicator for registering the extent of movement of said body member including a pair of indicator elements, one of which is operatively connected to said roller whereby it is moved relatively to the other indicator element and in response to movement of said body member over a drafting surface, and the other of which is supported for manual adjustment whereby a coordinated relation may be established between it and said one indicator, and contact means for holding said roller against slipping on said drafting surface as it is rotated incident to rolling movement of the body member whereby the body member is maintained on a true course and for holding said body member on a true course when moved longitudinally of the axis of said roller.

5. A geometrical instrument of the type adapted to be employed as a drafting apparatus, comprising a body member, means for supporting said body member for rolling movement over a drafting surface and including a roller, an indicator for registering the extent of movement of said body member including a pair of indicator elements, one of which is operatively connected to said roller whereby it is moved relatively to the other indicator element and in response to movement of said body member over a drafting surface, and the other of which is supported for manual adjustment whereby a coordinated relation may be established between it and said one indicator, and contact means for holding said roller against slipping on said drafting surface as it is rotated incident to rolling movement of the body member whereby the body member is maintained on a true course and for holding said body member on a true course when moved longitudinally of the axis of said roller, said contact means including a series of tooth-like ribs provided on the periphery of said roller and disposed in a parallel relation to each other and to the axis of said roller.

6. A geometrical instrument of the type adapted to be employed as a drafting apparatus, comprising a body member, means for supporting said body member for rolling movement over a drafting surface along two different courses at an angle to each other and including a pair of rollers arranged for alternate rotation as the body member is alternately moved along said courses, an indicator for registering the extent of movement of said body member along said courses and including a pair of indicator elements, one of which is operatively connected to one of said rollers and is adapted to be moved by that roller as the body member is moved along one course, and the other of which is operatively connected to the other of said rollers and is adapted to be moved by that roller as the body member is moved along the other course, and contact means adapted to engage and cooperate with said surface for maintaining said body member true to said courses as it is moved along the same.

7. A geometrical instrument of the type adapted to be employed as a drafting apparatus, comprising a body member, means for supporting said body member for rolling movement over a drafting surface along two different courses at an angle to each other and including a pair of rollers arranged for alternate rotation as the body member is alternately moved along said courses, an indicator for registering the extent of movement of said body member along said courses and including a pair of indicator elements, one of which is operatively connected to one of said rollers and is adapted to be moved by that roller as the body member is moved along one course, and the other of which is operatively connected to the other of said rollers and is adapted to be moved by that roller as the body member is moved along the other course, and contact means adapted to engage and cooperate with said surface for maintaining said body member true to said courses as it is moved along the same, said contact means including a series of tooth-like ribs provided on the periphery of each of said rollers, a rib of one roller being adapted to slide along and penetrate the drawing surface as the other roller is rotated incident to movement of the body member, and vice-versa.

8. A geometrical instrument of the type adapted to be employed as a drafting apparatus, comprising a body member, means for supporting said body member for rolling movement over a drafting surface along two different courses at an angle to each other and including a pair of rollers arranged for alternate rotation as the body member is alternately moved along said courses, an indicator for registering the extent of movement of said body member along said courses and including a pair of indicator elements, one of which is operatively connected to one of said rollers and is adapted to be moved by that roller as the body member is moved along one course, and the other of which is supported for manual adjustment whereby a coordinated relation may be established between it and said one indicator element and is operatively connected to the other of said rollers and is adapted to be moved by that roller as the body member is moved along the other course, and contact means adapted to engage and cooperate with said surface for maintaining said body member true to said courses as it is moved along the same.

9. A geometrical instrument of the type adapted to be employed as a drafting apparatus, comprising a body member, means for supporting said body member for rolling movement over a drafting surface along two different courses at an angle to each other and including a pair of rollers arranged for alternate rotation as the body member is alternately moved along said courses, an indicator for registering the extent of movement of said body member along said courses and including a pair of indicator elements, one of which is operatively connected to one of said rollers and is adapted to be moved by that roller as the body member is moved along one course, and the other of which is supported for manual adjustment whereby a coordinated relation may be established between it and said one indicator element and is operatively connected to the other of said rollers and is adapted to be moved by that roller as the body member is moved along the other course, and contact means adapted to engage and cooperate with said surface for maintaining said body member true to said courses as it is moved along the same, said contact means including a series of tooth-like ribs provided on the periphery of each of said rollers, a rib of one roller being adapted to slide along and penetrate the drawing surface as the other roller is rotated incident to movement of the body member, and vice-versa.

10. A geometrical instrument of the type adapted to be employed as a drafting apparatus, comprising a body member, means for supporting said body member for rolling movement over a drafting surface along two different courses at an angle to each other and including a pair of rollers arranged for alternate rotation as the body member is alternately moved along said courses, an indicator for registering the extent of movement of said body member along said courses and including a pair of indicator elements, one of which is operatively connected to one of said rollers and is adapted to be moved by that roller as the body member is moved along one course, a manually rotatable support on which the other of said indicator elements is carried and by which that indicator element may be moved into a coordinated relation to said one indicator element, a driving element on which said support is carried for movement therewith and with relation to which said support may be manually rotated, said driving element being operatively connected to the other of said rollers and adapted to be rotated by that roller as the body member is moved along the other course whereby said other indicator element is rotated with respect to said one indicator element, and contact means adapted to engage and cooperate with said surface for maintaining said body member true to said courses as it is moved along the same.

11. A geometrical instrument of the type adapted to be employed as a drafting apparatus, comprising a body member, means for supporting said body member for rolling movement over a drafting surface along two different courses at an angle to each other and including a pair of rollers arranged for alternate rotation as the body member is alternately moved along said courses, an indicator for registering the extent of movement of said body member along said courses and including a pair of indicator elements, one of which is operatively connected to one of said rollers and is adapted to be moved by that roller as the body member is moved along one course, a manually rotatable support on which the other of said indicator elements is carried and by which that indicator element may be moved into a coordinated relation to said one indicator element, a driving element on which said support is carried for movement therewith and with relation to which said support may be manually rotated, said driving element being operatively connected to the other of said rollers and adapted to be rotated by that roller as the body member is moved along the other course whereby said other indicator element is rotated with respect to said one indicator element, and contact means adapted to engage and cooperate with said surface for maintaining said body member true to said courses as it is moved along the same, said contact means including a series of tooth-like ribs provided on the periphery of each of said rollers, a rib of one roller being adapted to slide along and penetrate the drawing surface as the other roller is rotated incident to movement of the body member, and vice-versa.

EDMUND R. BARANY.